Dec. 20, 1960  W. H. PAYNE ET AL  2,965,075
HYDRAULIC TORQUE BOOSTERS
Filed July 27, 1959  2 Sheets-Sheet 1
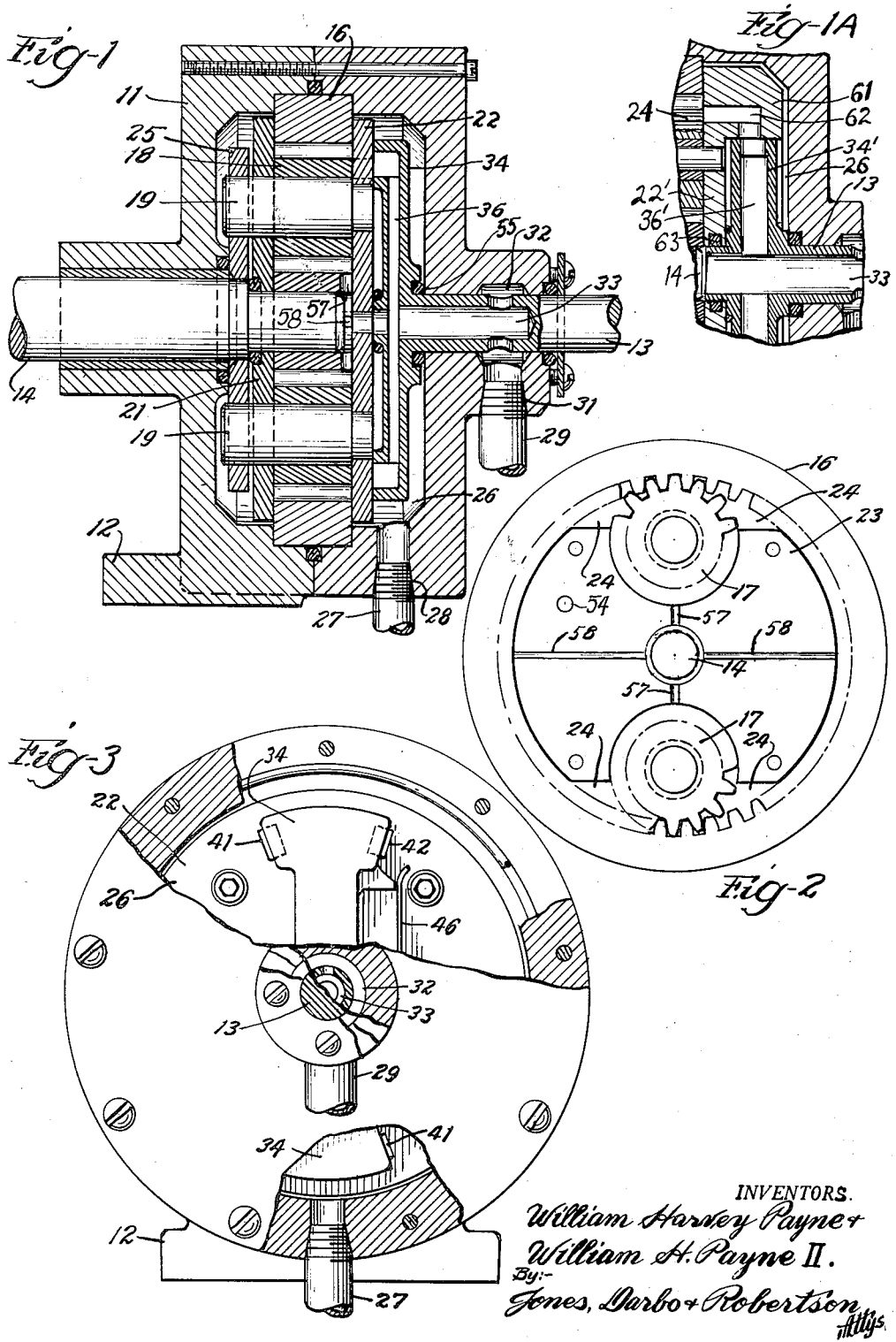
INVENTORS.
William Harvey Payne +
William H. Payne II.
By:-
Jones, Darbo + Robertson
Attys.

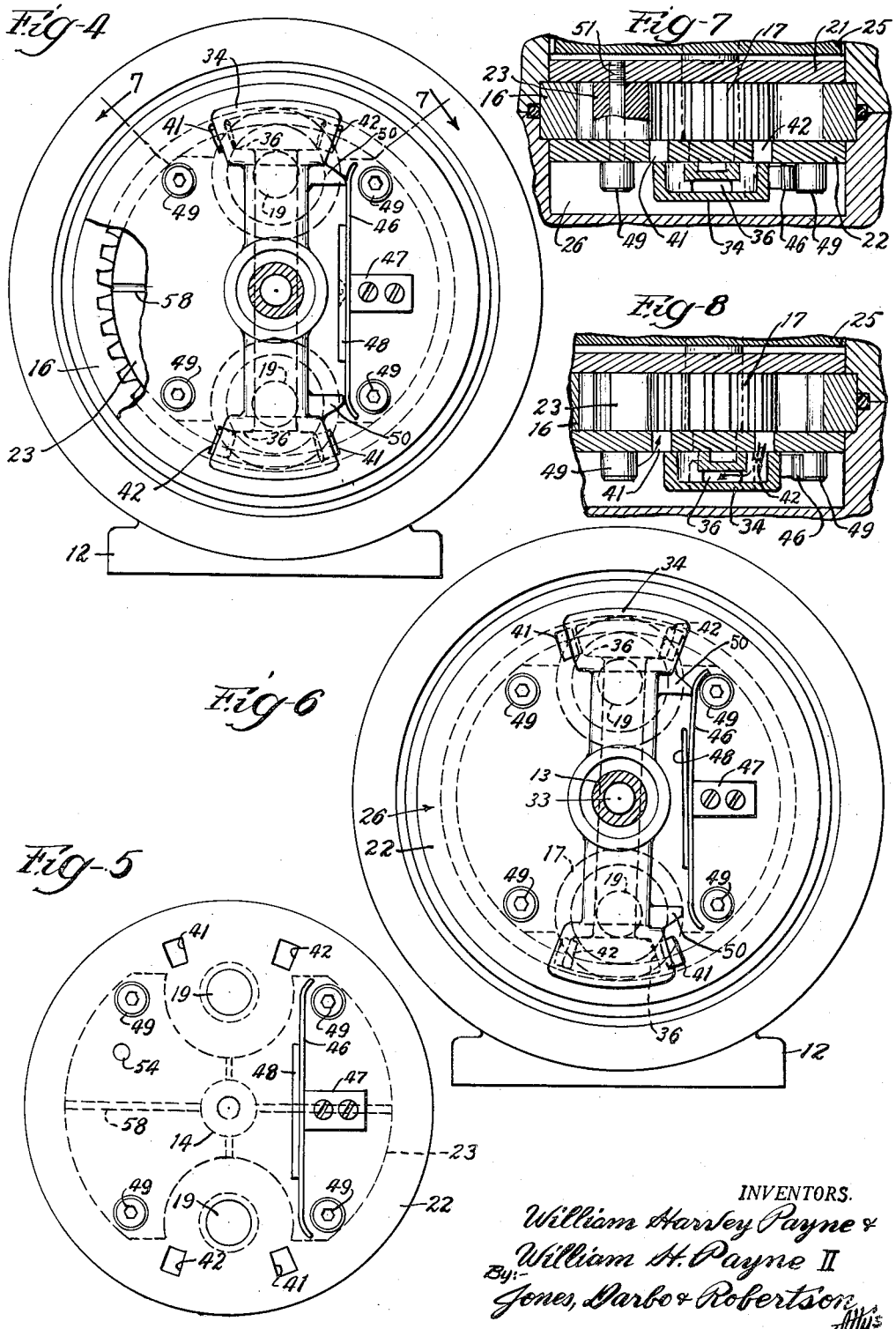

United States Patent Office 2,965,075
Patented Dec. 20, 1960

2,965,075

HYDRAULIC TORQUE BOOSTERS

William Harvey Payne and William Harvey Payne II, both of Laurelwood Farms, Pine Hall, N.C.

Filed July 27, 1959, Ser. No. 829,655

14 Claims. (Cl. 121—70)

Hydraulic boosters have many possible uses. One of the best known and most exacting is for vehicle steering. A very slight turn of the steering wheel should develop maximum available hydraulic steering force, and a barely perceptible turn of the wheel should initiate the development of the hydraulic steering force. Heretofore, most of the hydraulic steering boosters have been of the piston and cylinder type, usually with complex modifications.

Rotary hydraulic boosters have several advantages and some have recently been tried. Some of these have been quite complex and expensive to manufacture, and some have been characterized by excessive play or low sensitivity in the sense that a large movement was required to develop full hydraulic torque or power. Rotary boosters are sometimes called torque boosters, connoting the fact that when a small torque, or turning force, is applied to an input shaft, a much greater torque is applied to the output shaft.

According to the present invention, a torque booster is provided which combines the simplicity of the gear pump with a simple valving that can be designed to give extremely high sensitivity.

Compactness, simplicity and balance for avoiding side thrust on the bearings are all achieved by using a plurality of planetary gears, each meshing with internal teeth on a fixed ring gear. End plates and interposed shroud members form supply-discharge chambers on opposite sides of each meshing zone. Ports through at least one end plate, rotating with and always aligned with these chambers, are opened and closed by valve means moving with the input shaft to selectively connect them with high pressure supply conduits or with discharge conduits to drive the rotary unit in the direction initiated by the input shaft.

Additional objects and advantages of the invention will be apparent from the following description and the drawings:

*Designation of figures*

Figure 1 is a cross-sectional view taken along an axial plane of one preferred form of the invention.

Figure 1A is a fragmentary cross section showing some modifications of the structure shown in Figs. 1 to 8.

Figure 2 is a view showing the side faces of the gears and of the shroud plate of Fig. 1 with which the ends of the gear teeth have a sliding sealing fit.

Figure 3 is, for the most part, an end view of the structure shown in Fig. 1 broken away, however, to various depths to show different parts.

Figure 4 is a view similar to Fig. 3 but with the entire nearer half of the housing omitted.

Figure 5 is a view of the shroud assembly of Fig 1 from the side showing the face of the ported side plate.

Figure 6 is a view similar to Fig. 4 but showing the valving manifold swung clockwise.

Figure 7 is a fragmentary view taken approximately on the line 7—7 of Fig. 4 particularly for showing the valving manifold in its midposition with respect to the ports in the side plate.

Figure 8 is a view similar to Figure 7 but showing the valving manifold shifted, as in Fig. 6, in the clockwise direction.

*General description*

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The form of the invention chosen for illustration in Figs. 1 to 8 includes a housing 11 provided with a bracket 12 by which it may be mounted or at least secured against rotation. An input shaft 13, which may carry the steering wheel at its far end, extends into the housing on one side while an output shaft 14 extends into the housing from the opposite side. An internally toothed ring gear 16 is carried by the housing and secured against turning therein. A pair of planetary gears 17 are in meshing relationship with ring gear 16 and rotate on bearing pins, or shafts, 19 carried jointly by rear side plate 21 and ported or front side plate 22. Side plates 21 and 22 are firmly secured to a shroud plate 23 between them and which spaces them for proper sealing sliding engagement with the faces of the gears 16 and 17. The shroud plate 23 also is in wiping engagement with the tips of the teeth on gears 16 and 17, thus sealing supply-discharge chambers 24 on opposite sides of each of the planetary gears 17. The shroud means comprising end plates or side plates 22 and 21 and shroud plate 23 are in driving relationship to shaft 14 so that as hydraulic fluid causes the planetary gears 17 to roll along ring gear 16 this movement, which turns end plates 21 and 22 by means of pins 19, will also turn output shaft 14. The illustrated form of the drive connection comprises a plate 25 welded to output shaft 14 and having holes snugly fitting extensions of pins 19.

The cavity 26 within the housing 11 is flooded with hydraulic fluid under pressure by supply pipe 27 which may be threaded or otherwise sealed to a fitting 28 formed by the housing. A discharge pipe 29 is similarly secured to a discharge fitting 31 of the housing, but it communicates with an annular groove 32 surrounding input shaft 13 and communicating, through apertures in the input shaft 13 with a longitudinal passage or bore 33 extending axially from the end of input shaft 13.

The valving manifold 34 is carried by the input shaft 13 to be turned by it and is provided with a discharge conduit 36 communicating through bore 33 and groove 32 with discharge pipe 29.

The normal or idle position of parts is shown in Fig. 3. Here it is seen that the valving manifold 34 exposes ports 41 and 42 equally to the main cavity 26 and through it to the high pressure supply pipe 27. Figs. 4 and 8 show that valving manifold 34 also exposes the ports 41 and 42 equally to discharge passage 36 and through it to discharge pipe 29. Thus, the hydraulic fluid can flow from the main cavity or supply chamber 26 through both the ports 41 and 42 to the discharge conduit 36. Fluid pressure on opposite sides of planetary gears 17 is equalized, so no motion results.

Should it be desired to turn the parts clockwise, as in steering to the right, the input shaft 13 is manually turned slightly to the right, in which case the relative positioning of parts seen in Fig. 6 may result. Here it is seen that the ports of one pair, namely 41, remain exposed, and in fact, become more fully exposed, to the cavity or supply chamber 26, but neither of these ports 41 is any longer exposed to discharge conduit 36. On the other hand, both of ports 42 are in relatively open communication with discharge conduit 36, but these ports are not exposed at all to supply chamber 26. Accordingly, oil enters both ports 41 and discharges from both ports 42. As indicated in Fig. 8 the oil entering a port 41 is exposed to one side of a planetary gear 17, while oil can discharge from the opposite side of planetary gear 17. As will be understood by those familiar with gear pumps, this causes a rotation of the planetary gears 17 which in turn drives them along fixed ring gear 16 and this movement drags the bearing pins 19 and they in turn rotate plate 25 and output shaft 14. As input shaft 13 is turned in either direction, output shaft 14 is thus hydraulically driven in the same direction through the same angle of movement. When the movement of input shaft 13 ceases, the movement of output shaft 14 also ceases, except that there will be a minute further residual movement until the ports 41 and 42 have again reached a balanced position exposed equally to supply chamber 26, and also exposed equally to discharge conduit 36. In this condition, both sides of planetary gears 17 are exposed to equal pressure, and no turning force develops.

Centering springs on stops

For many purposes it will be preferred that centering springs be provided to urge the valving manifold 34 towards its neutral position, thus, as seen in Fig. 4 a leaf spring 46 may extend in opposite directions from a post 47 and be limited by rigid plate 48 against flexing further to the left at either end than shown in Fig. 4. This tends to hold the valving manifold 34 yieldably in the neutral position shown in Fig. 4. However, when a turning force is applied to input shaft 13 the valving manifold 34 will flex one end or the other of spring 46 toward the position shown in Fig. 6. At this position the end of the spring 46 strikes upstanding head 49 of securing screws 51 which hold the ported plate 22 and the other end plate 21 clamped to the intermediate shroud member 23. If the centering spring 46 should be omitted, movement of the valving manifold 34 would nevertheless be limited by its striking the heads 49. In the event of hydraulic failure or inadequacy, manual force can be exerted on the output shaft 14 by transmission through manifold 34 and its lugs 50 to head 49 thus turning the end plates 21 and 22 and shaft 14. The heads 49 can be used as stops, and in any event suitable stops should be provided, even if centering spring 46 is omitted. Lugs 50 should be positioned a little further outwardly than shown, so each would strike directly toward the contact point of head or stop 49 with spring 46.

Balance of hydraulic forces

As indicated in Fig. 5 a small passage 54 through the shroud assembly (ported plate 22, intermediate shroud member 23 and end plate 21) may equalize the pressure in chamber 26 to eliminate or minimize axial thrust on the rotating parts. Preferably the shroud assembly is free to move axially on shaft 14 so as to center itself with respect to ring gear 16.

In the form of the invention illustrated in Fig. 1, a slight hydraulic pressure is exerted toward the left in Fig. 1 on valving manifold 34. This results from the fact that the outside of this manifold is exposed to high pressure fluid while the inside of the valving ends is exposed only to the discharge pressure which is usually approximately atmospheric pressure. This ensures adequate sealing of the valving manifold 34 on the ported plate 22. Resilient seal ring 55 may be under slight compression to ensure initial contact of the valving ends of valving manifold 34 with ported side plate 22. The left side hub of valving manifold 34 must not block this contact and is sealed by a separate resilient ring.

Pressure relief passages or grooves 57 may be provided through or along shroud plate 23 as seen best in Figs. 1 and 2. As seen best in Fig. 1 these passages 57 and 58 connect the tooth spaces with the discharge passage 36. This relieves the tooth spaces of planetary gears 17 of the high pressure without waiting for them to pass all of the way from the high pressure supply-discharge chamber 24 to the low pressure supply-discharge chamber 24. They need not be confined to the central locations shown, but they must not extend close enough to the supply-discharge chambers 24 to destroy the shrouding effect of shroud 23. In other words, there must always be at least one intervening tooth of planetary gear 17 wiping in sealing engagement along the concave sealing face of shroud 23 between each supply-discharge chamber 24 and any vent such as 57.

Seals such as O-ring seals are provided between the various shafts and the housing or other parts as indicated. A seal or gasket is also provided between the two halves of the housing. It does not need to seal also against the ring gear 16, inasmuch as that gear is bypassed anyway by passage 54. The O-rings seals may be designed according to accepted O-ring practice whether or not so shown.

Quick-acting valving

As is perhaps seen best in Fig. 7, ports 41 and 42 are both normally cracked open both to the high pressure chamber 26 and to the discharge passage 36. Preferably the dimensions are such that the slightest displacement of valving manifold 34 from the neutral position in either direction will result in an unequalized hydraulic pressure in the various supply-discharge chambers 24 so that torque will be exerted hydraulically on the output shaft 14. Preferably also a very slight movement of valving manifold 34 will completely remove hydraulic pressure from one set of supply-discharge chambers 24 while subjecting the other set of supply-discharge chambers 24 to full hydraulic pressure by cutting off its communication with discharge passage 36. To this end the various ports 41 and 42 are provided with valving edges of substantial length lying in or near radial planes and the valving manifold 34 is provided with substantially matching valving edges. Also the ports 41 and 42 are located as far from the axis as is convenient. Thus it is clear from a comparison of Figs. 4 and 6 that a very slight angular movement of valving manifold 34 between the positions represented by these two figures has fully closed off communication between ports 42 and high pressure chamber 26 while fully shutting off communication between ports 41 and discharge passage 36.

To the extent permitted by the foregoing considerations, the ports 41 and 42 should be large enough so that with the valving manifold 34 in neutral position there will be substantial flow of the hydraulic fluid from high pressure chamber 26 into each of ports 41 and 42 and directly out again into discharge passage 36. There would usually be a greater power loss if this idle flow is not permitted when the parts are in neutral position because with the usual system the output of the positive displacement pump would all have to be by-passed at maximum operating pressure.

In another form of the invention not shown both of the side plates are ported plates, and a valving plate cooperates with each, both valving plates being moved in unison with the input shaft. In this instance high pressure may be confined to one side of ring gear, the discharge fitting communicating with the cavity on the opposite side of ring gear. The valving ports would be differently positioned, but would have the same operation.

Low friction valving

Figs. 7 and 8 show a detail not evident from the other figures; namely, that the valving contact of valving manifold 34 is reduced to a minimum safe area at each of ports 41 and 42. This results in only enough net hydraulic pressure pressing manifold 34 toward ported plate 22 to safely effectuate the seal between them, and with the rubbing surface ground flat and polished, no excessive friction is expected.

In the event that the use of very high hydraulic pressures should result in excessive frictional drag between valving manifold 34 and side plate 22, this can be avoided in either of two ways. One is to have the left-hand or inner hub of valving manifold 34 run on side plate 22 with careful machining so that the valving ends of manifold 34 are in touching but nonpressure contact at all times with the side plate 22. A way that may result in easier machining and longer life is illustrated in Fig. 1A. Here the peripheral face of valving manifold 34' is used for the valving function, side plate 22' having an extension 61 with which the peripheral face of valving manifold 34' is in sliding sealing contact, the two sealing faces being arcuate about the axes of shafts 13 and 14. A passage 62 opens in one direction to the supply-discharge chamber 24 and in the other direction to the face engaged by the peripheral face of valving manifold 34'. Of course, there would be one such passage 62 for each supply-discharge chamber 24, and at neutral positions these openings would be cracked open to both cavity 26 having high pressure therein and passage 36' having low pressure therein, and the valving action would be as indicated in Figs. 6 and 8 when the input shaft is turned.

Although in Fig. 1A the draftsman has failed to show the relief passages 57 and 58 and their communication with bore 33, they could be provided in much the same manner as in Fig. 1. It may be noted in this connection that in either Fig. 1 or Fig. 1A the valving manifold may have a hub arranged to telescope inside of side plate 22 to facilitate the sealing thereof with an ordinary O-ring seal. Inasmuch as no axial pressure is required in Fig. 1A between the valving manifold and the other parts, it may be desirable to use only O-rings arranged as O-ring 63 in Fig. 1A so that the O-ring will not produce any axial thrust on the parts. In this way it may be possible to design the hydraulic torque booster to be completely free of unbalanced axial forces.

Known practice for hydraulic pumps may of course be followed in shaping the teeth of the meshing gears. In case it may be desired to use a tooth shape which has been unsatisfactory heretofore because of producing excessive pressure in the roots of tooth spaces, the present construction lends itself to making such tooth shapes easily unobjectionable. This is accomplished merely by providing a small aperture through side plate 22 or side plate 21 at points which will be aligned with the root of each tooth space when it is at or closely approaching the fully meshed position. If it should be found that the high pressure in the cavity causes a wasteful or objectionable flow through such apertures, this can be avoided by providing a flap valve in the form of a simple leaf spring on the outside of each such aperture. Probably such flap valve will be necessary, because to avoid such high pressures the apertures must communicate with the tooth space at the first instant that a tooth meshing into it seals it. It probably would be impractical to do so and at the same time avoid instances in which the oil would flow from the high pressure cavities through the aperture and an unsealed tooth space into a supply-discharge chamber 24 which the valving action has connected to discharge.

From the foregoing it is evident that a very quiet, compact, powerful, endurable positive displacement torque booster has been provided. In spite of the small overall diameter, there is the equivalence of two gear motors and each may be extended in the axial direction as far as may be necessary to meet a given requirement. Of course, more than two planetary gears could be provided if necessary, and each one has the equivalence of another gear motor. So long as there is a plurality of planetary gears there can be a balance of torque or moments so that the driving force exerts no side thrust on the bearing of the output shaft. In the preferred form there is also approximate balancing of the hydraulic forces axially. In both forms there is high sensitivity in that the most minute angular movement of the input shaft begins the application of hydraulic power and a very slight angular movement of the input shaft gives rise to full hydraulic power or torque. Maximum sensitivity is obtained by having elongate valving edges lying in or near radial planes and at points remote from the axis. It may be noted incidentally that maximum sensitivity could perhaps be obtained by having the valving edges on arcuate end walls of the valving manifold. No matter how long it might be desirable to make these valving edges, the full length of each would be at the maximum radius of the valving manifold from the axis. However the locations of the valving edges illustrated in Figs. 1 to 8 approach this ideal arrangement closely enough to provide very high sensitivity.

The booster here described may be a unit in a more complex assembly. In that event, the input and output shafts will serve as such for the unit, whether or not they so serve for the assembly.

We claim:

1. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft and cooperating with said ports for opening upon movement in either direction the ports on the trailing side of the valve means to communication with the supply fitting and the other ports for communication with the discharge fitting.

2. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned.

3. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, said ports being located substantially as far from the axis of the fixed gear as the roots of the teeth on the outer sides of the planetary gears and said ports and valving means having cooperating valving edges of substantial extent approximately in radial planes, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned.

4. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, said ports being located substantially as far from the axis of the fixed gear as the roots of the teeth on the outer sides of the planetary gears, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned.

5. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned; the shroud means being floatingly mounted to be free to shift axially to center itself with respect to the ring gear and being exposed to the same fluid pressure on nearly equal areas on opposite sides.

6. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned; the shroud means and the ring gear being floatingly centered axially with respect to one another.

7. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned, and means limiting the relative movement of the valving means with respect to the output shaft and effective to transmit torque from the input shaft to the output shaft.

8. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, said ports being located substantially as far from the axis of the fixed gear as the roots of the teeth on the outer sides of the planetary gears and said ports and valving means having cooperating valving edges of substantial extent approximately in radial planes, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned, and means limiting the relative movement of the valving means with respect to the output shaft and effective to transmit torque from the input shaft to the output shaft with a slight relative movement suitable for fully establishing said communication.

9. A hydraulic power booster including a fixed gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned.

10. A hydraulic power booster including a fixed gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned; said ports being located substantially as far from the axis of the fixed gear as the roots of the teeth on the outer sides of the planetary gears and said ports and valving means having cooperating valving edges of substantial extent approximately in radial planes.

11. A hydraulic power booster including a fixed gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned; said ports being located substantially as far from the axis of the fixed gear as the roots of the teeth on the outer sides of the planetary gears and said ports and valving means having cooperating valving edges of substantial extent approximately in radial planes; the shroud means and fixed gear being floatingly centered axially with respect to one another.

12. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing means for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned; the shroud means being free to move axially with respect to the output shaft to center itself with respect to the ring gear.

13. A hydraulic power booster including a fixed internally toothed ring gear, a plurality of planetary gears meshing with the fixed gear and spaced about its axis for balance of torque about the axis, an output shaft coaxial with the fixed gear, shroud means carried by the output shaft in driving relationship thereto and including side plates slideably engaging the sides of the gears, sealing the ends of the tooth interstices, and shroud members in sliding sealing engagement with the tooth ends at proper points to leave supply-discharge chambers exposed to the meshing and unmeshing zones on opposite sides of each planetary gear adjacent the fixed gear, bearing pins for the planetary gears carried by the side plates, at least one of the side plates having ports therethrough constantly aligned with the supply-discharge chambers, a housing surrounding said gears and shroud means and having supply and discharge fittings, an input shaft rotatable in the housing coaxially with the output shaft, and valving means concentric with the fixed gear and turned by the input shaft for establishing communication of the supply-discharge chambers selectively with the supply and discharge fittings to turn the shroud means in the direction the input shaft is turned; the shroud means being free to move axially with respect to the output shaft to center itself with respect to the ring gear; the bearing pins for the planetary gears being extended, and means carried by the output shaft in driving relation thereto and driven by the bearing pins but engaging them with axial movability.

14. A hydraulic power booster including a fixed internally toothed ring gear, a planetary gear meshing with the fixed gear, an output shaft, shroud means rotatively mounted coaxially with the fixed gear and including side plates slideably engaging the sides of the gears for sealing the ends of the tooth interstices and shroud members in sliding sealing engagement with the tooth ends at proper points to leave supply-discharge chambers exposed to the meshing and unmeshing zones on opposite sides of the planetary gear adjacent the fixed gear, planetary bearing means for the planetary gear in driving relationship to the output shaft, at least one of the side plates having ports therethrough constantly aligned with the supply-discharge chambers, a housing surrounding said gears and shroud means and having supply and discharge fittings, an input shaft rotatable in the housing, and valving means concentric with the fixed gear, cooperating with said ports, and turned by the input shaft for establishing communication of the supply-discharge chambers selectively with the supply and discharge fittings to turn the shroud means in the direction selected by the turning of the input shaft.

References Cited in the file of this patent

UNITED STATES PATENTS

| | | |
|---|---|---|
| 1,116,975 | Bergesen | Nov. 10, 1914 |
| 2,240,874 | Thomas et al. | May 6, 1941 |
| 2,899,937 | Nuebling | Aug. 18, 1959 |